(12) United States Patent
Lippold et al.

(10) Patent No.: US 11,719,118 B2
(45) Date of Patent: Aug. 8, 2023

(54) AIR SUPPLY SYSTEM

(71) Applicant: Honeywell International Inc., Charlotte, NC (US)

(72) Inventors: Timothy Lippold, Huntington Beach, CA (US); Giorgio C. Isella, Culver City, CA (US); Bryce Drysdale, Huntington Beach, CA (US); Gary Kumagai, Walnut, CA (US); Thomas O'Brien, Huntington Beach, CA (US); Niall McCabe, Torrance, CA (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 17/658,773

(22) Filed: Apr. 11, 2022

(65) Prior Publication Data

US 2022/0333497 A1    Oct. 20, 2022

Related U.S. Application Data

(60) Provisional application No. 63/174,865, filed on Apr. 14, 2021.

(51) Int. Cl.
| *F01D 15/10* | (2006.01) |
| *F02C 7/141* | (2006.01) |
| *F02C 7/18* | (2006.01) |
| *F02C 7/36* | (2006.01) |

(52) U.S. Cl.
CPC .............. *F01D 15/10* (2013.01); *F02C 7/141* (2013.01); *F02C 7/18* (2013.01); *F02C 7/36* (2013.01); *F05D 2220/76* (2013.01); *F05D 2260/213* (2013.01); *F05D 2260/232* (2013.01); *F05D 2260/606* (2013.01)

(58) Field of Classification Search
CPC .. F01D 15/10; F02C 7/141; F02C 7/18; F02C 7/36; F05D 2220/76; F05D 2260/213; F05D 2260/232; F05D 2260/606
See application file for complete search history.

(56) References Cited

U.S. PATENT DOCUMENTS

| 4,419,926 A | 12/1983 | Cronin et al. |
| 6,079,211 A | 6/2000 | Woollenweber et al. |
| 6,938,420 B2 | 9/2005 | Kawamura et al. |
| 9,605,557 B1 * | 3/2017 | Rolling .................... F02K 3/06 |

(Continued)

FOREIGN PATENT DOCUMENTS

| CN | 109372775 A | * | 2/2019 |
| CN | 109372775 A | | 2/2019 |

(Continued)

OTHER PUBLICATIONS

Extended Search Report from counterpart European Application No. 22168248.7 dated Sep. 6, 2022, 8 pp.

(Continued)

*Primary Examiner* — Jacob M Amick
*Assistant Examiner* — Charles J Brauch
(74) *Attorney, Agent, or Firm* — Shumaker & Sieffert, P.A.

(57) ABSTRACT

A system configured to compress air to be used by a power generation system includes a first compressor stage configured to be driven by exhaust air from the power generation system and a second compressor stage configured to be driven by electrical power generated by the power generation system.

17 Claims, 3 Drawing Sheets

(56) References Cited

U.S. PATENT DOCUMENTS

| | | |
|---|---|---|
| 2005/0095488 A1 | 5/2005 | Formanski et al. |
| 2007/0077459 A1 | 4/2007 | Walton, II et al. |
| 2017/0335756 A1 | 11/2017 | Donkin |
| 2019/0145416 A1 | 5/2019 | Donato et al. |
| 2020/0003115 A1 | 1/2020 | Jones et al. |
| 2020/0063648 A1 | 2/2020 | Gerold |
| 2021/0372412 A1 | 12/2021 | Kemmer et al. |

FOREIGN PATENT DOCUMENTS

| | | |
|---|---|---|
| CN | 110566341 B | 12/2019 |
| WO | 2016124575 A1 | 8/2016 |
| WO | 2021092021 A1 | 5/2021 |

OTHER PUBLICATIONS

Response to Extended Search Report dated Sep. 6, 2022, from counterpart European Application No. 22168248.7 filed Dec. 6, 2022, 21 pp.

* cited by examiner

AIR SUPPLY SYSTEM

This application claims the benefit of U.S. Provisional Patent Application No. 63/174,865, filed Apr. 14, 2021, the entire contents of which is incorporated herein by reference.

TECHNICAL FIELD

This disclosure generally relates to systems and methods for supply air for a power generation system.

BACKGROUND

An air supply control system includes equipment that can provide air flow at a prescribed pressure, temperature, and flow rate to support an electrical power generation system (e.g., hydrogen fuel cells). The air supply control system and a propulsion system can consume the electrical power generated by the generation system.

SUMMARY

The present disclosure describes example devices, systems, and methods related to supply air for power generation. According to one example of this disclosure, a supply air system includes two or more compressor stages. Exhaust air from a power generation system can drive a first compressor stage, and a motor can drive a second compressor stage. In some examples, a supply air system of this disclosure is more efficient than a supply air system that includes a single-stage compressor or supply air systems that utilize alternative two-stage arrangements.

According to one example of this disclosure, a system includes a first compressor stage configured to be driven by exhaust air from a power generation system; and a second compressor stage configured to be driven by electrical power generated by the power generation system, wherein an outlet of the first compressor stage is coupled to an inlet of the second compressor stage, wherein the first and second compressor stages are configured to compress air to be used by the power generation system.

According to another example of this disclosure, a system includes an electrical power generation system; and a supply air subsystem comprising: a first compressor stage configured to be driven by exhaust air from the electrical power generation system; and a second compressor stage configured to be driven by electrical power, wherein an outlet of the first compressor stage is coupled to an inlet of the second compressor stage, wherein the first and second compressor stages are configured to compress air to be used by the electrical power generation system.

According to another example of this disclosure, a method for compressing air, the method comprising: driving a first compressor stage with exhaust air from a power generation system; driving a second compressor stage by electrical power generated by the power generation system, wherein an outlet of the first compressor stage is coupled to an inlet of the second compressor stage; and outputting compressed air, from the second compressor stage, to the power generation system.

The details of one or more examples are set forth in the accompanying drawings and the description below. Other features, objects, and advantages will be apparent from the description and drawings, and from the claims.

DETAILED DESCRIPTION

Various examples described below are generally directed to apparatuses, methods, and systems, that relate to a supply air system that includes two or more compressor stages. The supply air system may be configured to deliver supply air to a power generation system, such as a fuel cell system.

The system described in this disclosure may include a unique arrangement of turbomachinery, a heat exchanger, valves, a filter, controllers, and sensors. The system may be configured to provide an efficient method for drawing outside air, boosting the air pressure, and delivering pressure-regulated and temperature-controlled air to a fuel cell subsystem at a prescribed flow rate. Air discharged from the fuel cell subsystem can be used to recover mechanical power for driving a turbo compressor. A separate electrically powered motor-driven compressor can be used as the primary power source for the air supply control system. The fuel cell subsystem may be configured to produce the electrical power for the air supply control system, and the surplus electrical power from the fuel cell subsystem can be used to drive a propulsion system.

Figure 1:
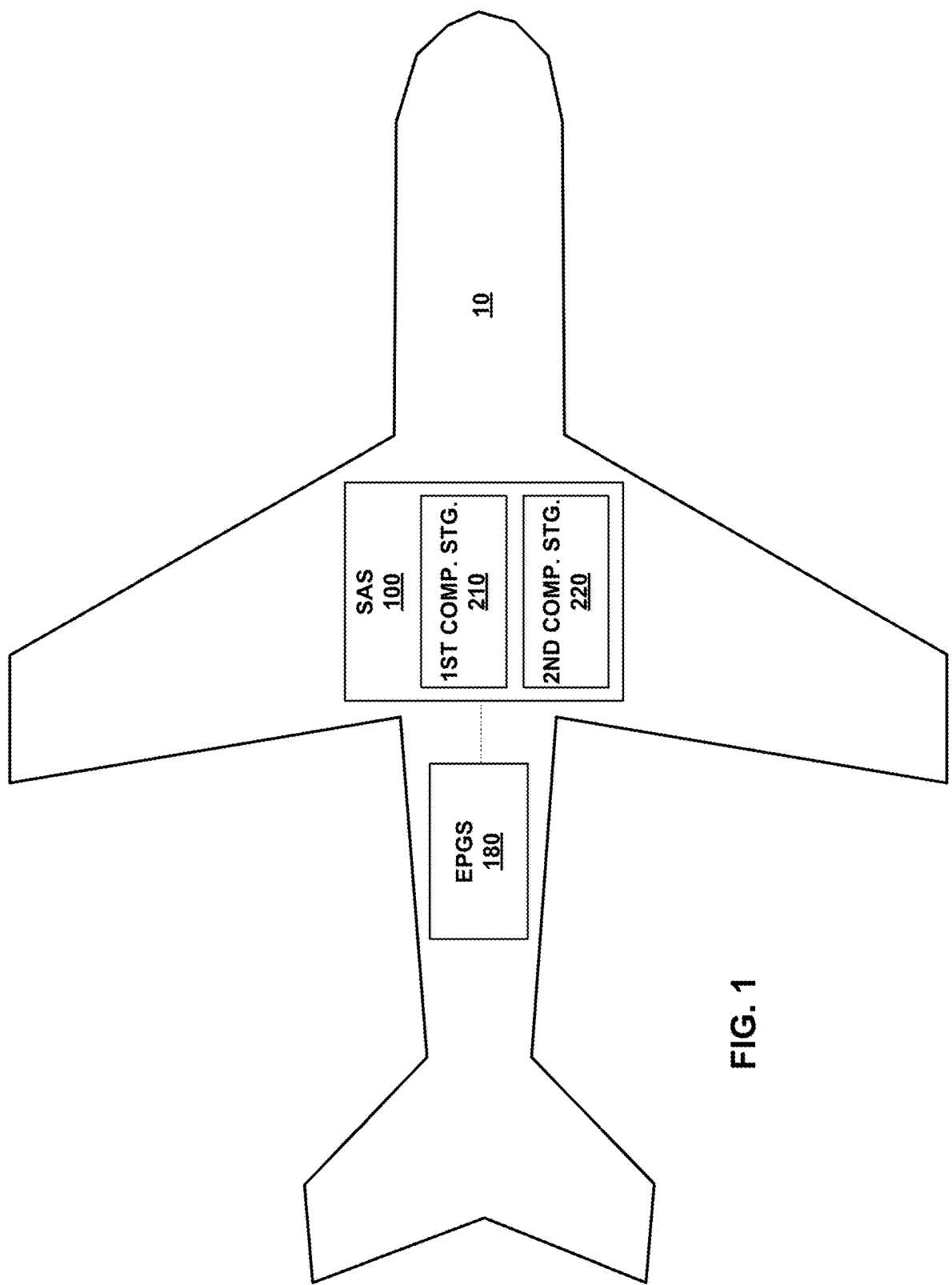
FIG. 1 is a conceptual block diagram depicting an example supply air system, in accordance with aspects of this disclosure.

FIG. 1 is a conceptual block diagram of a vehicle 10 that includes a supply air system (SAS) 100 and an electrical power generation system (EPGS) 180. Electrical power generation system 180 may, for example, be a fuel cell subsystem. Although shown in FIG. 1 as having a fixed-wing form factor, vehicle 10 generally represents any sort of aircraft that include an SAS and an EPGS. Moreover, the techniques of this disclosure may also be implemented in other types of vehicles that include an SAS and an EPGS.

Supply air subsystem 100 includes first compressor stage 210 and second compressor stage 220. First compressor stage 210 and second compressor stage 220 are configured to compress air to be used by electrical power generation system 180. First compressor stage 210 is configured to be driven by exhaust air from electrical power generation system 180. Second compressor stage 220 is configured to be driven by electrical power generated by electrical power generation system 180.

Figure 2:
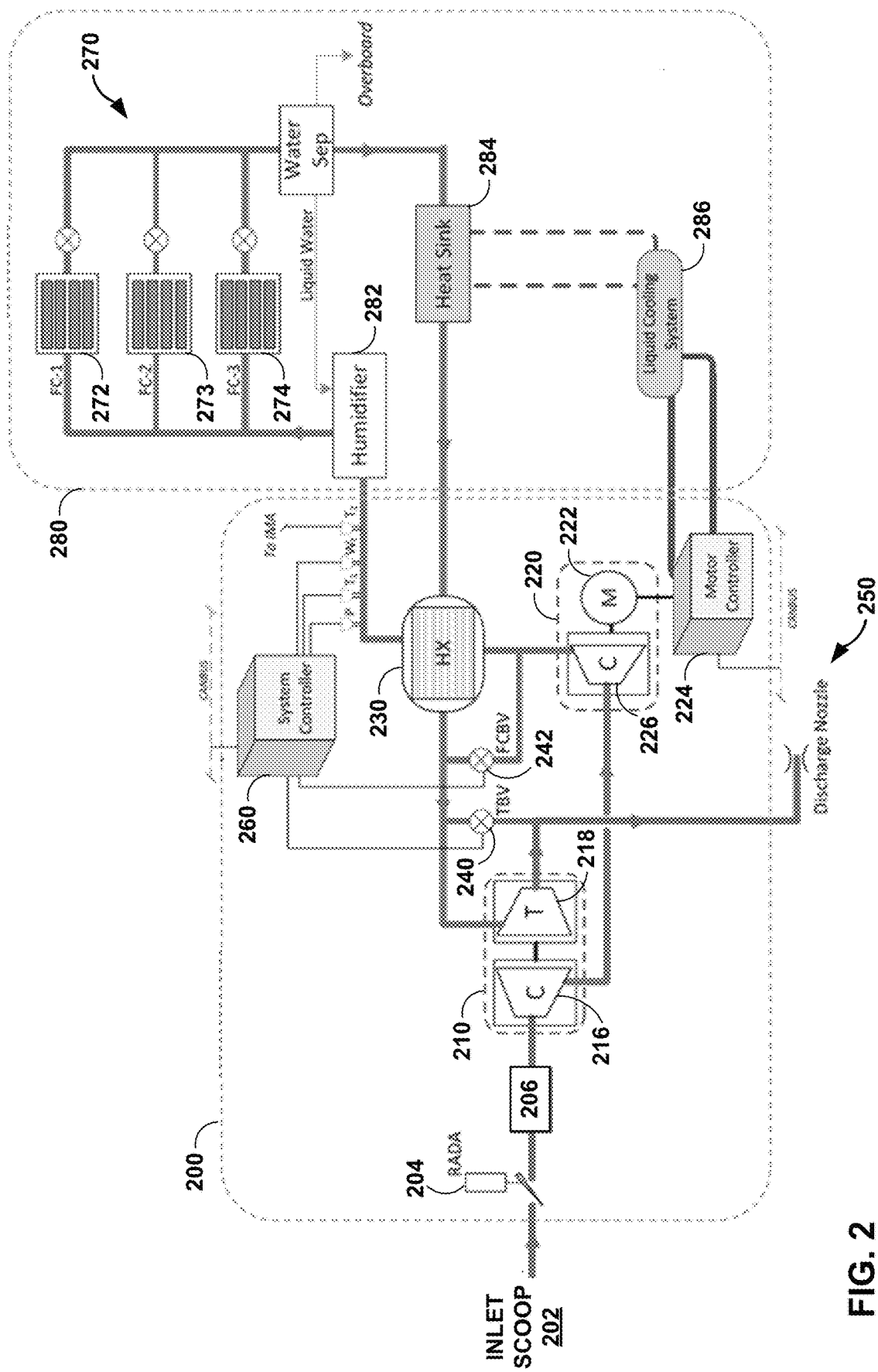
FIG. 2 is a conceptual block diagram depicting an example implementation of the supply air system of FIG. 1.

FIG. 2 is a conceptual block diagram depicting an example supply air system 200, in accordance with aspects of this disclosure. FIG. 2 represents one example of how supply air system 100 and electrical power generation system 180 of FIG. 1 may be implemented, but other implementations are also within the scope of this disclosure. In the example shown in FIG. 2, system 200 includes compressor stages 210 and 220, heat exchanger 230, and controllers 224 and 260. Compressor stage 210 includes compressor 216, which is configured to be driven by turbine 218. Compressor stage 220 includes compressor 226, which is configured to be driven by motor 222.

Inlet scoop 202 may be configured to draw in ambient air and deliver the air to particulate filter 206. Ram air door actuator (RADA) 204 may be configured to open or close to allow air to pass to filter 206 and/or to block air (e.g., for aerodynamics). One or more ducts may be configured to deliver the filtered air to a compressor inlet of air-driven turbo compressor stage 210. Compressor 216 can boost the air pressure and temperature. Compressor stage 210 may be configured to receive air from heat exchanger 230 that drives turbine 218. Compressor 216 may be coaxial with turbine

218, such that compressor 216 is driven by turbine 218. In some examples, compressor stage 210 may be partially or entirely air-powered. Thus, compressor stage 210 may be able to recover energy from the exhaust air of fuel cell subsystem 280.

One or more ducts may be configured to deliver the boosted air from turbo compressor 216 to motor-driven compressor 226 that can further boost the air pressure and temperature. Electrical motor 222 may be configured to drive motor-driven compressor 226. Motor controller 224 may be configured to control the motor to provide the desired compressor speed. Motor 222 and controller 224 may be configured to receive electrical power generated by fuel cells 272-274. By splitting the compression of the supply air for fuel cells 272-274 into two stages, system 200 may have better efficiency, as compared to another system with a single compression stage driven by a motor. For example, compressor stage 210 may be driven entirely or mostly off the exhaust air from subsystem 280, reducing the total electrical power consumption of system 200. The remaining compression can be performed by motor 222, which is driven by electricity from subsystem 280.

In examples in which motor 222 and compressor 226 are not coaxial with compressor stage 210, compressor stage 220 may be simpler than a motor that is coaxial with a compressor and an energy-recovery turbine. A motor that is coaxial with a compressor and an energy-recovery turbine may include a more complex gearbox and may be controlled with more complex control techniques, as compared to motor 222.

Air discharged from motor-driven compressor 226 can travel through a duct to heat exchanger 230. Heat exchanger 230 may be configured to cool the air from motor-driven compressor 226 with either discharge air from fuel cell subsystem 280, or from a separate cooling source such as liquid cooling subsystem 286, or a combination of these subsystems. Alternatively, the air delivered from the discharge of motor-driven compressor 226 can be routed to bypass heat exchanger 230 via fuel cell bypass valve (FCBV) 242. Air diverted through FCBV 242 is merged with air exiting the cold side of heat exchanger 230.

Air exiting the hot side of heat exchanger 230 may be ducted through humidifier 282 to fuel cell subsystem 280, where the air can support electrical power generation in fuel cells 272-274. Heath sink 284 can cool the exhaust air from fuel cells 272-274 before the air returns to heat exchanger 230.

Air discharged from fuel cell subsystem 280 may be cooled via an external cooling heat sink 284 before being delivered to system heat exchanger 230. The air discharged from fuel cell subsystem 280 can act as a heat sink to the bleed air from the exit of motor-driven compressor 226. Air exiting the cold side of heat exchanger 230 is delivered to turbine section 218 of air-driven turbo compressor stage 210. This air can act as the motive force to drive turbo compressor stage 210. Alternatively, air can be bypassed around turbo compressor turbine 218 via turbine bypass valve (TBV) 240, thus controlling the energy consumed by turbo compressor 216. Air that exits turbo compressor turbine 218 or TBV 240 can be ducted to discharge nozzle 250 where the air is discharged to ambient.

System controller 260 may be configured to control TBV 240 and FCBV 242 to achieve the system requirements. For example, system controller 260 can open TBV 240 to reduce the flow of air through turbine 218. With TBV 240 open, turbine 218 may recover less energy from the exhaust. System controller 260 may be configured to open FCBV 242 to reduce the flow and temperature or air to fuel cell subsystem 280.

The pressure, temperature, and flow rate of the air delivered to fuel cell subsystem 280 is monitored by system controller 260 using an arrangement of pressure, temperature, and flow sensors. System controller 260 uses this data to monitor and control the pressure, temperature and flow rate of the air delivered to fuel cell subsystem 280.

In an alternative arrangement, heat exchanger 230 can be installed such that the hot side inlet is ducted from the compressor discharge of turbo compressor 216, and the hot side exit is ducted to the compressor inlet of motor-driven compressor 226. In this arrangement, the cold side of heat exchanger 230 is either as described above, or is located between the discharge of turbine 218 and the discharge nozzle 250. In other words, heat exchanger 230 can be installed downstream from turbo compressor 216 and upstream of motor-driven compressor 226. In this arrangement, the air compressed by compressor 216 is fed into the heat exchanger 230 before being compressed by compressor 226, and the outlet of compressor 226 may be coupled to humidifier 282.

The system may include an inlet actuator to change the inlet area of the system for the purpose of reducing aircraft drag. In some examples, the system may optionally also include filtration means to mitigate the effects of hydrocarbons, ozone and other volatile organic compounds that can adversely affect fuel cell subsystem 280.

Fuel cell subsystem 280 may be configured to generate electricity for a propulsor that is not shown in FIG. 2. In some examples, supply air system 200 and fuel cell subsystem 280 can be mounted on a vehicle, and the propulsor can generate propulsion for the vehicle. Systems 200 and 280 can be mounted in a pod underneath a wing of an aircraft. System 200 may be positioned in the forward-facing portion of the pod, with subsystem 280 behind system 200. The pod may also include a hydrogen tank for fuel cells 272-274.

Figure 3:
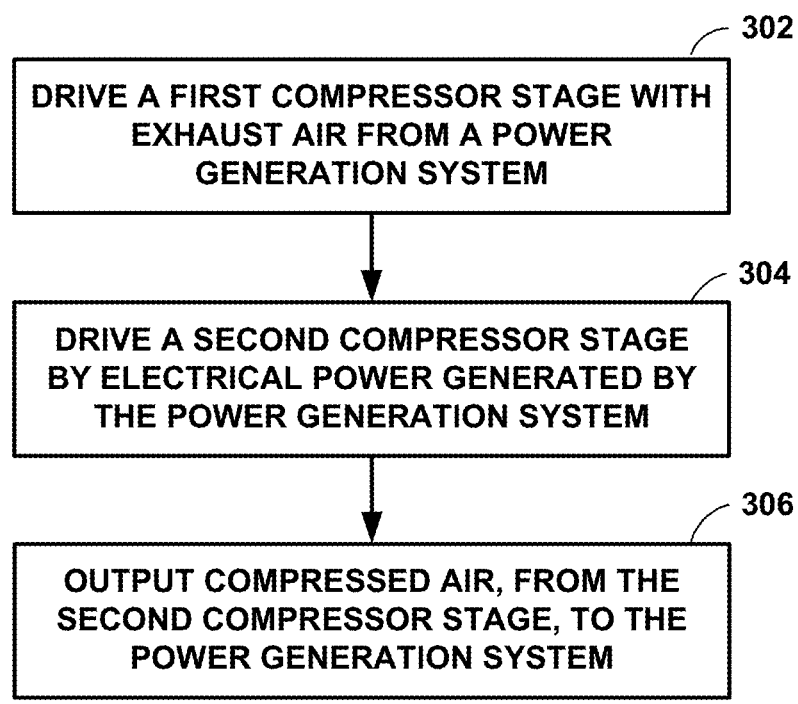
FIG. 3 is a flow chart illustrating a process for performing techniques of this disclosure.

FIG. 3 is a flow chart illustrating a process for performing techniques of this disclosure. The techniques of FIG. 3 may, for example, be performed by a system that includes supply air system 100 and electrical power generation system 180 of FIG. 1 or system 200 and fuel cell subsystem 280 of FIG. 2.

In the example of FIG. 3, the system drives a first compressor stage with exhaust air from a power generation system (302). For example, to drive the first compressor stage with the exhaust air from the power generation system, the system may, for example, drive the first compressor stage by a turbine and drive the turbine by the exhaust air. As shown in FIG. 3, the system drives a second compressor stage by electrical power generated by the power generation system (304). To drive the second compressor stage by the electrical power generated by the power generation system, the system may, for example, drive the second compressor stage by a motor and drive the motor by the electrical power generated by the power generation system. An outlet of the first compressor stage may be coupled to an inlet of the second compressor stage. As further shown in FIG. 3, the system outputs compressed air, from the second compressor stage, to the power generation system (306). To output the compressed air, from the second compressor stage, to the power generation system, for example, the system may deliver the compressed air to the power generation system via a duct and a heat exchanger.

The following aspects represent examples of devices, systems, and techniques described above. Although the aspects provide specific combinations of features, it is contemplated that unless stated to the contrary, other combinations of features described in the aspects are also within the scope of this disclosure.

Aspect 1: A system including a heat exchanger including a first side and a second side, wherein the first side of the heat exchanger is configured to be coupled to a fuel cell subsystem, and wherein the second side of the heat exchanger is configured to be coupled to the fuel cell subsystem.

Aspect 2: The system of the preceding aspect, further including a motor-driven compressor, wherein the first side of the heat exchanger is coupled to the motor-driven compressor.

Aspect 3: The system of the preceding aspects or any combination thereof, wherein the second side of the heat exchanger is coupled to a turbine.

Aspect 4: The system of the preceding aspects or any combination thereof, wherein the first side of the heat exchanger is configured to receive fluid from a motor-driven compressor.

Aspect 5: The system of the preceding aspects or any combination thereof, wherein the first side of the heat exchanger is configured to deliver fluid to the fuel cell subsystem.

Aspect 6: The system of the preceding aspects or any combination thereof, wherein the first side of the heat exchanger is configured to deliver fluid to a humidifier that is upstream from the fuel cell subsystem.

Aspect 7: The system of the preceding aspects or any combination thereof, wherein the second side of the heat exchanger is configured to receive fluid from the fuel cell subsystem.

Aspect 8: The system of the preceding aspects or any combination thereof, wherein the second side of the heat exchanger is configured to receive fluid from a heat sink downstream from the fuel cell subsystem.

Aspect 9: The system of the preceding aspects or any combination thereof, wherein the second side of the heat exchanger is configured to deliver fluid to a turbine of an air-driven turbo compressor.

Aspect 10: The system of the preceding aspects or any combination thereof, further including a first bypass valve configured to deliver fluid from upstream of the first side of the heat exchanger to downstream of the second side of the heat exchanger.

Aspect 11: A system includes a first compressor stage configured to be driven by exhaust air from a power generation system. The system also includes a second compressor stage configured to be driven by electrical power generated by the power generation system. The first and second compressor stages are configured to compress air to be used by the power generation system.

Aspect 12: The system of the preceding aspects or any combination thereof, wherein an outlet of the first compressor stage is coupled to an inlet of the second compressor stage.

Aspect 13: The system of the preceding aspects or any combination thereof, wherein an outlet of the second compressor stage is coupled to a heat exchanger, wherein the heat exchanger is configured to also receive the exhaust air.

Aspect 14: The system of the preceding aspects or any combination thereof, wherein the first compressor stage is configured to be driven by a turbine, wherein the turbine is configured to be driven by the exhaust air.

Aspect 15: The system of the preceding aspects or any combination thereof, wherein the second compressor stage is configured to be driven by a motor, wherein the motor is configured to be driven by the electrical power generated by the power generation system.

Aspect 16: The system of the preceding aspects or any combination thereof, further including a bypass valve coupled to an outlet of the second compressor stage and also coupled to a turbine that is configured to drive the first compressor stage.

Aspect 17: The system of the preceding aspects or any combination thereof, wherein an inlet of the first compressor stage is coupled to a ram air door via a duct.

Aspect 18: The system of the preceding aspects or any combination thereof, wherein an outlet of the first compressor stage is coupled to an inlet of the second compressor stage via a duct.

Aspect 19: The system of the preceding aspects or any combination thereof, wherein an outlet of the second compressor stage is coupled to a heat exchanger via a duct.

Aspect 20: The system of the preceding aspects or any combination thereof, wherein a turbine is mechanically coupled to the first compressor stage, and wherein an inlet of the turbine is coupled to a heat exchanger via a duct.

Aspect 21: The system of the preceding aspects or any combination thereof, wherein a turbine is mechanically coupled to the first compressor stage, and wherein an outlet of the turbine is coupled to a discharge ambient via a duct.

Aspect 22: The system of the preceding aspects or any combination thereof, wherein a heat exchanger is coupled to an exhaust of a fuel cell subsystem via a duct.

Aspect 23: The system of the preceding aspects or any combination thereof, wherein a motor is configured to drive the second compressor stage, and wherein the motor is electrically coupled to a fuel cell subsystem.

Aspect 24. A system comprising: a first compressor stage configured to be driven by exhaust air from a power generation system; and a second compressor stage configured to be driven by electrical power generated by the power generation system, wherein an outlet of the first compressor stage is coupled to an inlet of the second compressor stage, wherein the first and second compressor stages are configured to compress air to be used by the power generation system.

Aspect 25. The system of aspect 24, wherein an outlet of the second compressor stage is coupled to a heat exchanger, wherein the heat exchanger is configured to also receive the exhaust air.

Aspect 26. The system of aspect 24 or 25, wherein the first compressor stage is configured to be driven by a turbine, wherein the turbine is configured to be driven by the exhaust air.

Aspect 27. The system of any of aspects 24-26, wherein the second compressor stage is configured to be driven by a motor, wherein the motor is configured to be driven by the electrical power generated by the power generation system.

Aspect 28. The system of any of aspects 24-27, further including a bypass valve coupled to an outlet of the second compressor stage and also coupled to a turbine that is configured to drive the first compressor stage.

Aspect 29. The system of any of aspects 24-28, wherein an inlet of the first compressor stage is coupled to a ram air door via a duct.

Aspect 30. The system of any of aspects 24-29, wherein an outlet of the first compressor stage is coupled to an inlet of the second compressor stage via a second duct.

Aspect 31. The system of any of aspects 24-30, wherein an outlet of the second compressor stage is coupled to a heat exchanger via a third duct.

Aspect 32. The system of any of aspects 24-31, wherein a turbine is mechanically coupled to the first compressor stage, and wherein an inlet of the turbine is coupled to a heat exchanger via a fourth duct.

Aspect 33. The system of any of aspects 24-32, wherein a turbine is mechanically coupled to the first compressor stage, and wherein an outlet of the turbine is coupled to a discharge ambient via a fifth duct.

Aspect 34. The system of any of aspects 24-33, wherein a heat exchanger is coupled to an exhaust of a fuel cell subsystem via a sixth duct.

Aspect 35. The system of any of aspects 24-34, wherein a motor is configured to drive the second compressor stage, and wherein the motor is electrically coupled to a fuel cell subsystem.

Aspect 36. A system comprising: an electrical power generation system; and a supply air subsystem comprising: a first compressor stage configured to be driven by exhaust air from the electrical power generation system; a second compressor stage configured to be driven by electrical power, wherein an outlet of the first compressor stage is coupled to an inlet of the second compressor stage, wherein the first and second compressor stages are configured to compress air to be used by the electrical power generation system.

Aspect 37. The system of aspect 36, wherein the supply air subsystem further comprises a heat exchanger configured to receive the exhaust air from the electrical power generation system via a duct.

Aspect 38. The system of aspect 37, wherein the electrical power generation system further comprises a heat sink thermally coupled to the heat exchanger.

Aspect 39. The system of any of aspects 36-38, wherein the electrical power generation system comprises a fuel cell subsystem.

Aspect 40. The system of any of aspects 36-39, wherein: the first compressor stage is configured to be driven by a turbine, and the turbine is configured to be driven by the exhaust air, and the second compressor stage is configured to be driven by a motor, and the motor is configured to be driven by the electrical power generated by the power generation system.

Aspect 41. A method for compressing air, the method comprising: driving a first compressor stage with exhaust air from a power generation system; and driving a second compressor stage by electrical power generated by the power generation system, wherein an outlet of the first compressor stage is coupled to an inlet of the second compressor stage; and outputting compressed air, from the second compressor stage, to the power generation system.

Aspect 42. The method of aspect 41, wherein outputting the compressed air, from the second compressor stage, to the power generation system comprises delivering the compressed air to the power generation system via a duct and a heat exchanger.

Aspect 43. The method of aspect 41 or 42, wherein: driving the first compressor stage with the exhaust air from the power generation system driving the first compressor stage by a turbine and driving the turbine by the exhaust air; and driving the second compressor stage by the electrical power generated by the power generation system comprises driving the second compressor stage by a motor and driving the motor by the electrical power generated by the power generation system.

The various electronic devices, including controllers 124 and 160, described in this disclosure may be implemented as one or more ASICs, as a magnetic nonvolatile RAM or other types of memory, a mixed-signal integrated circuit, a central processing unit (CPU), an FPGA, a microcontroller, a programmable logic controller (PLC), a system on a chip (SoC), a subsection of any of the above, an interconnected or distributed combination of any of the above, or any other type of component or one or more components capable of performing the techniques described herein.

Functions executed by electronics associated with the devices systems described herein may be implemented, at least in part, by hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in electronics included systems described herein. The terms "processor," "processing device," or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to the devices and systems described herein may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure. The computer-readable medium may be non-transitory.

Various aspects of the disclosure have been described. These and other aspects are within the scope of the following claims.

What is claimed is:

1. A system comprising:
    a first compressor stage configured to be driven by a turbine; and
    a second compressor stage configured to be driven by electrical power generated by the power generation system, wherein an outlet of the first compressor stage is coupled to an inlet of the second compressor stage, wherein the first and second compressor stages are configured to compress air to be used by the power generation system;
    the turbine configured to be driven by discharge air from a power generation system, the discharge air passing through a heat exchanger, wherein the heat exchanger is configured to cool exhaust coming from an outlet of the second compressor.

2. The system of claim 1, further comprising a motor configured to drive the second compressor stage, wherein the motor is configured to be driven by the electrical power generated by the power generation system.

3. The system of claim 1, further including a bypass valve coupled to the outlet of the second compressor stage and also coupled to the turbine that is configured to drive the first compressor stage.

4. The system of claim 1, wherein an inlet of the first compressor stage is coupled to a ram air door via a duct.

5. The system of claim 1, wherein an outlet of the first compressor stage is coupled to an inlet of the second compressor stage via a duct.

6. The system of claim 1, wherein the outlet of the second compressor stage is coupled to the heat exchanger via a duct.

7. The system of claim 1, wherein the turbine is mechanically coupled to the first compressor stage, and wherein an inlet of the turbine is coupled to the heat exchanger via a duct.

8. The system of claim 1, wherein the turbine is mechanically coupled to the first compressor stage, and wherein an outlet of the turbine is directly coupled to a discharge nozzle configured to discharge to ambient via a duct.

9. The system of claim 1, wherein the heat exchanger is coupled to an exhaust of a fuel cell subsystem via a duct.

10. The system of claim 1, wherein a motor is configured to drive the second compressor stage, and wherein the motor is electrically coupled to a fuel cell subsystem.

11. A system comprising:
an electrical power generation system; and
a supply air subsystem comprising:
a first compressor stage configured to be driven by a turbine;
a second compressor stage configured to be driven by electrical power, wherein an outlet of the first compressor stage is coupled to an inlet of the second compressor stage, wherein the first and second compressor stages are configured to compress air to be used by the electrical power generation system;
the turbine configured to be driven by discharge air from a power generation system, the discharge air passing through a heat exchanger, wherein the heat exchanger is configured to cool exhaust coming from an outlet of the second compressor.

12. The system of claim 11, wherein the electrical power generation system further comprises a heat sink thermally coupled to the heat exchanger.

13. The system of claim 11, wherein the electrical power generation system comprises a fuel cell subsystem.

14. The system of claim 11, wherein:
the first compressor stage is configured to be driven by a turbine, and the turbine is configured to be driven by the exhaust air, and
the second compressor stage is configured to be driven by a motor, and the motor is configured to be driven by the electrical power generated by the power generation system.

15. A method for compressing air, the method comprising:
driving a first compressor stage with discharge air from a power generation system, the discharge air passing through a heat exchanger, wherein the heat exchanger is configured to cool exhaust coming from an outlet of the second compressor; and
driving a second compressor stage by electrical power generated by the power generation system, wherein an outlet of the first compressor stage is coupled to an inlet of the second compressor stage;
outputting compressed air, from the second compressor stage, to the power generation system.

16. The method of claim 15, wherein outputting the compressed air, from the second compressor stage, to the power generation system comprises delivering the compressed air to the power generation system via a duct and the heat exchanger.

17. The method of claim 15, wherein:
driving the first compressor stage with the exhaust air from the power generation system comprises driving the first compressor stage by a turbine and driving the turbine by the exhaust air; and
driving the second compressor stage by the electrical power generated by the power generation system comprises driving the second compressor stage by a motor and driving the motor by the electrical power generated by the power generation system.

* * * * *